(12) United States Patent
Lindsay

(10) Patent No.: US 6,832,745 B2
(45) Date of Patent: Dec. 21, 2004

(54) BEVERAGE CONTAINER HOLDER ASSEMBLY FOR VEHICLE

(75) Inventor: Paul H. Lindsay, Vernon, NY (US)

(73) Assignee: Mini-Fini, LLC, Liverpool, NY (US)

( * ) Notice: Subject to any disclaimer, the term of this patent is extended or adjusted under 35 U.S.C. 154(b) by 0 days.

(21) Appl. No.: 10/430,094

(22) Filed: May 6, 2003

(65) Prior Publication Data
US 2004/0222345 A1 Nov. 11, 2004

(51) Int. Cl.$^7$ .................................................. A47K 1/08
(52) U.S. Cl. ................ 248/311.2; 248/214; 248/224.7; 248/229.14
(58) Field of Search .................. 248/229.1, 229.14, 248/311.2, 226.11, 230.1, 230.5, 231.61, 214, 224.7

(56) References Cited

U.S. PATENT DOCUMENTS

| | | | | |
|---|---|---|---|---|
| 539,698 A | * | 5/1895 | Milligan ................. 248/346.11 |
| 578,629 A | * | 3/1897 | Dowd ........................... 70/182 |
| 1,073,747 A | * | 9/1913 | Eichert .................. 248/231.61 |
| 2,461,256 A | * | 2/1949 | Black ..................... 248/231.41 |
| 2,708,062 A | | 5/1955 | Poyer ........................... 224/29 |
| 2,784,577 A | * | 3/1957 | Beaham, III ................ 248/146 |
| 3,002,665 A | | 10/1961 | Allen ........................ 224/42.42 |
| 3,050,223 A | | 8/1962 | Scioloro ........................ 224/29 |
| 3,126,184 A | * | 3/1964 | Kropp ........................... 248/73 |
| 3,146,738 A | * | 9/1964 | Telarico ....................... 108/135 |
| 3,408,032 A | * | 10/1968 | Francis ........................ 248/450 |
| 3,673,723 A | * | 7/1972 | Lazar et al. ................... 40/729 |
| 3,897,722 A | * | 8/1975 | Harris ........................... 99/345 |
| 4,256,281 A | | 3/1981 | Harris et al. ................. 248/231 |
| 4,858,990 A | * | 8/1989 | Combs-Rose et al. ... 248/279.1 |
| 4,997,156 A | * | 3/1991 | Allen ........................ 248/311.2 |
| 5,018,374 A | * | 5/1991 | Montano ....................... 70/233 |
| 5,069,407 A | * | 12/1991 | Williams ................ 248/222.11 |
| 5,086,958 A | | 2/1992 | Nagy ....................... 224/42.42 |
| 5,135,195 A | * | 8/1992 | Dane ........................ 248/311.2 |
| 5,249,702 A | | 10/1993 | Topp et al. .................. 220/705 |
| 5,673,835 A | * | 10/1997 | Kalat ........................... 224/556 |
| 5,772,166 A | * | 6/1998 | Adams ................... 248/231.81 |
| 5,868,362 A | * | 2/1999 | Daoud .......................... 248/71 |
| 6,045,179 A | * | 4/2000 | Harrison .................. 297/188.2 |
| 6,354,658 B1 | * | 3/2002 | Sher et al. ............. 297/188.14 |
| 6,390,427 B1 | | 5/2002 | McConnell et al. ... 248/231.61 |
| 6,505,802 B2 | | 1/2003 | Fowler .................... 248/311.2 |

FOREIGN PATENT DOCUMENTS

FR 2612064 9/1988

* cited by examiner

Primary Examiner—Anita M. King
(74) Attorney, Agent, or Firm—Bernhard P. Molldrem, Jr.

(57) ABSTRACT

A cup holder and convenience tray assembly for a motor vehicle employs one or more support brackets that mount onto vertical columns at the front of the passenger compartment. The brackets have a clamp member with an vertical aperture of oval cross section which has a major axis oriented in the fore-and-aft direction. Each bracket also has a vertical socket positioned on the clamp member aligned along the major axis of the bracket aperture. The cup holder or similar accessory has a vertical pin that fits removably into the socket of the support bracket. Rubber petals help secure the beverage container and suppress rattling, and an embossed rubber member in the base breaks capillary seals. The convenience tray has a flat support shelf and a pin or pair of pins extend downward from a rear portion of the flat support shelf, each pin fitting into the socket of a respective support bracket. The accessories may also take the form of a vase, a cellular phone stand, or a picture frame.

17 Claims, 10 Drawing Sheets

BEVERAGE CONTAINER HOLDER ASSEMBLY FOR VEHICLE

BACKGROUND OF THE INVENTION

This invention relates to convenience accessories for the passenger compartment of a motor vehicle, and in particular relates to beverage holders that may be removably installed into the interior of the motor vehicle.

The invention is more particularly concerned with a cup holder, tray, container, or similar accessory item that may be mounted onto interior structure of the motor vehicle, e.g., on a vertical post or pillar that is situated between driver's and passenger's positions of a motor vehicle.

Recently, small or compact sporty vehicles have gained popularity with a number of drivers, and one of these vehicles is the Cooper Mini, manufactured by BMW. In these vehicles, there is typically only a limited amount of room on the dash or between the driver and passenger, and so many common accessory items, such as cupholders, have been omitted. The design of the interior of the Cooper Mini includes a console just under the center part of the dash, which is bounded on its left and right sides by a pair of vertical posts or columns. However, no one, to date, has suggested any practical means for utilizing the existing design structure to support such accessory items as beverage container holders.

In addition, because of the limited room on the interior of these smaller cars, any accessory that is mounted at the front interior, i.e., under the dash, will be in the way for some maneuvers, such as moving the seat forward, and has to have the capability of moving out of the way when necessary.

Moreover, there is frequently a need to place an accessory tray securely somewhere in the front interior of the vehicle, for example, to hold a sandwich or other meal item to be consumed by the driver or passenger while in the vehicle. However, to date no useful or effective accessory tray has been proposed for a vehicle of this type.

OBJECTS AND SUMMARY OF THE INVENTION

Accordingly, it is an object of the present invention to provide a vehicle accessory system that can be readily installed and used in a Cooper Mini or other vehicle having a similar interior design.

It is another object to provide a beverage holder system for the interior of a motor vehicle which can be easily installed onto an oval cross-section vertical post or column found at the front interior of the vehicle, and which is convenient to use and will also hold a beverage container securely in the vehicle.

It is a more specific object to provide a beverage holder accessory system that permits a great deal of flexibility in arrangement along the front columns of the vehicle interior, and which can easily be moved out of the way when necessary.

In accordance with one aspect of the present invention, a vehicle accessory holder assembly is adapted for use in the interior of a motor vehicle of the type in which there are one or more generally vertical support posts. In one exemplary embodiment, the vehicle has a pair of columns of an oval cross section at the front of the passenger compartment of the vehicle, i.e., below the dash and laterally spaced from one another between the front passenger's position and the driver's position. The assembly has one or more than one accessory holder support brackets that mount on the columns. The brackets are in the form of a clamp member having an aperture of oval cross section dimensioned to fit onto one of the vertical support posts. The oval cross section has a major axis which is oriented in the fore-and-aft direction as is that of the oval of the column profile. A threaded fastener, a hand lever, or equivalent means allow for tightening the clamp member in place on the associated support column. Each bracket also has a vertical socket positioned on the clamp member and the socket is aligned along the major axis of the oval cross-section aperture. The cup holder or other accessory holder has a vertical pin that fits removably into the socket of the support bracket. This permits the cup holder or other device to be installed and removed as desired by the driver or passenger, and permits the cup holder to swing out of the way, i.e., from left to right, for example, to create space when moving the passenger seat forward to access the rear of the passenger compartment.

Where the accessory device is a coffee cup holder or other beverage cup holder the same may have a generally cylindrical receptacle member that receives and supports a coffee cup or other drink container. A strut or similar supporting member extends from one side of the receptacle member, and a pin extends downward from the strut to be received into the socket of the support bracket. Favorably, there may be a pair of cutouts disposed oppositely on an upper portion of the receptacle member to accommodate the cup handle of the beverage cup.

Alternatively, or additionally, the accessory holder may includes a horizontal platform and a mount on the platform for removably holding a cellular phone instrument; a vase for holding one or more cut flowers; or frame for holding a picture.

The support brackets may also be used to support a tray member, in which case the tray member has a flat support shelf and the pin (or preferably a pair of pins) depend from a rear portion of said flat support shelf. These pins fit into the socket(s) of the respective support brackets.

The tray may itself have one or more sockets, so that a beverage holder of this type may be supported on the tray, by means of the pin of the beverage cup holder.

The above and many other objects, features, and advantages of this invention will be more fully appreciated from the ensuing description of a preferred embodiment, which is to be read in conjunction with the accompanying Drawing.

DETAILED DESCRIPTION OF THE PREFERRED EMBODIMENT

Figure 1:
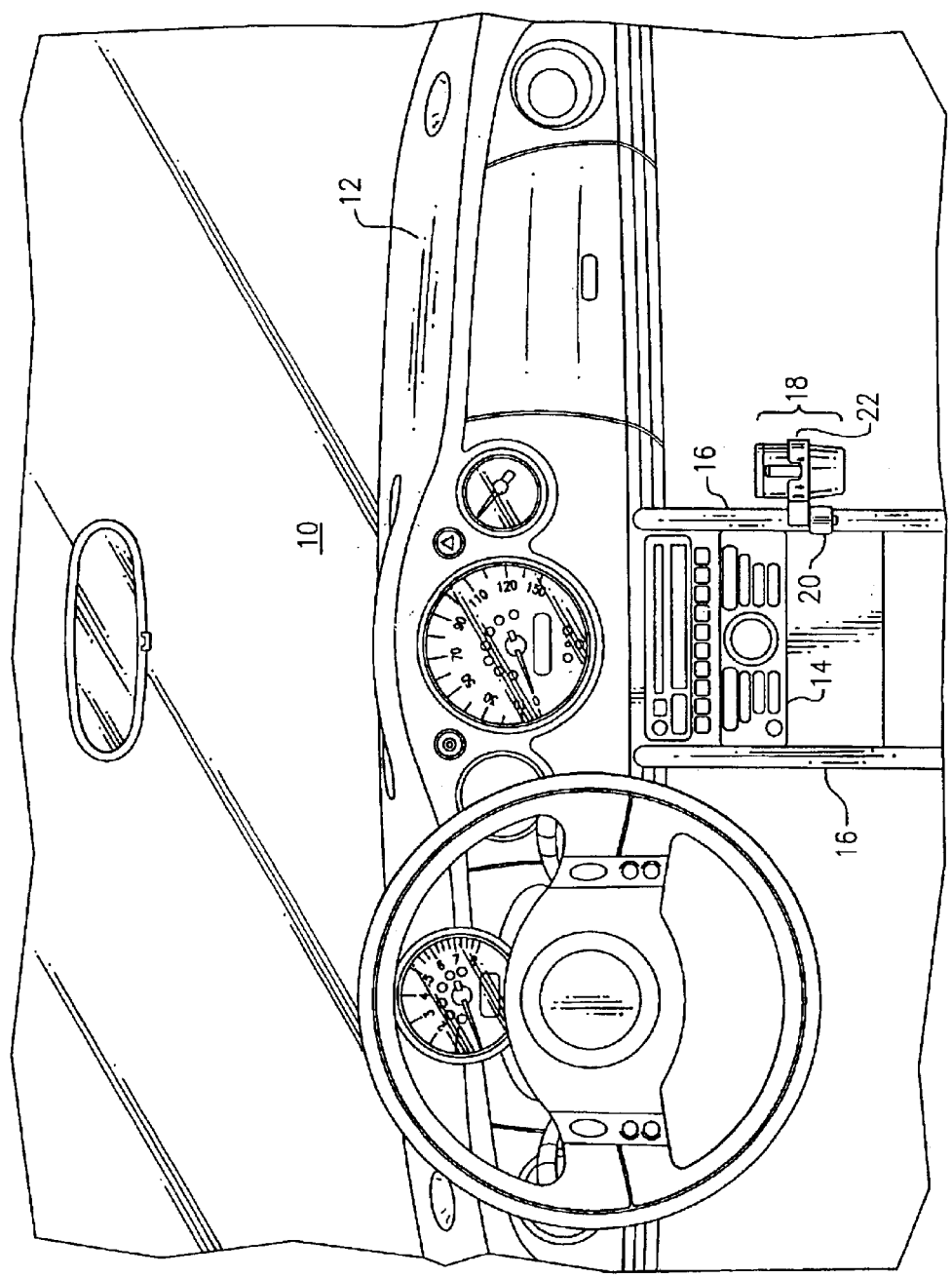
FIG. 1 is a view of the front interior of a vehicle of the type having one or more front vertical columns, and incorporating the beverage holder assembly according to an embodiment of the present invention.

With reference now to the Drawing, and initially to FIG. 1, an automobile interior 10 is seen from the passenger compartment, with a front dash 12 containing the usual instruments and steering wheel at the left, so that there is a passenger seat to the right and a driver's seat to the left (in North America). In Britain, Japan and Australia, the driver's position would be to the right and the passenger's position to the left. Beneath the dash 12 is a radio/tape player console and a comfort (heat/air conditioning) console 14, here between the positions of the driver and front seat passenger, with a pair of support columns or posts 16, 16 to the left and right of the console 14 beneath the dash 12. In this vehicle, these columns 16 have a generally oval or elliptical profile or cross section.

At the passenger side, i.e., to the right and mounted on the right column 16, is a cup holder assembly 18 according to an embodiment of this invention. The assembly 18 comprises a supporting bracket 20 that attaches onto the column 16 and a cup holder or beverage container holder 22 that fits into the bracket 20. The bracket 20 can be positioned at any desired height along the lower part of the column 16. The pin connection between the cup holder 22 and the bracket 20 permits the cup holder to pivot so it can be moved or swung from left to right when necessary.

Figure 2:
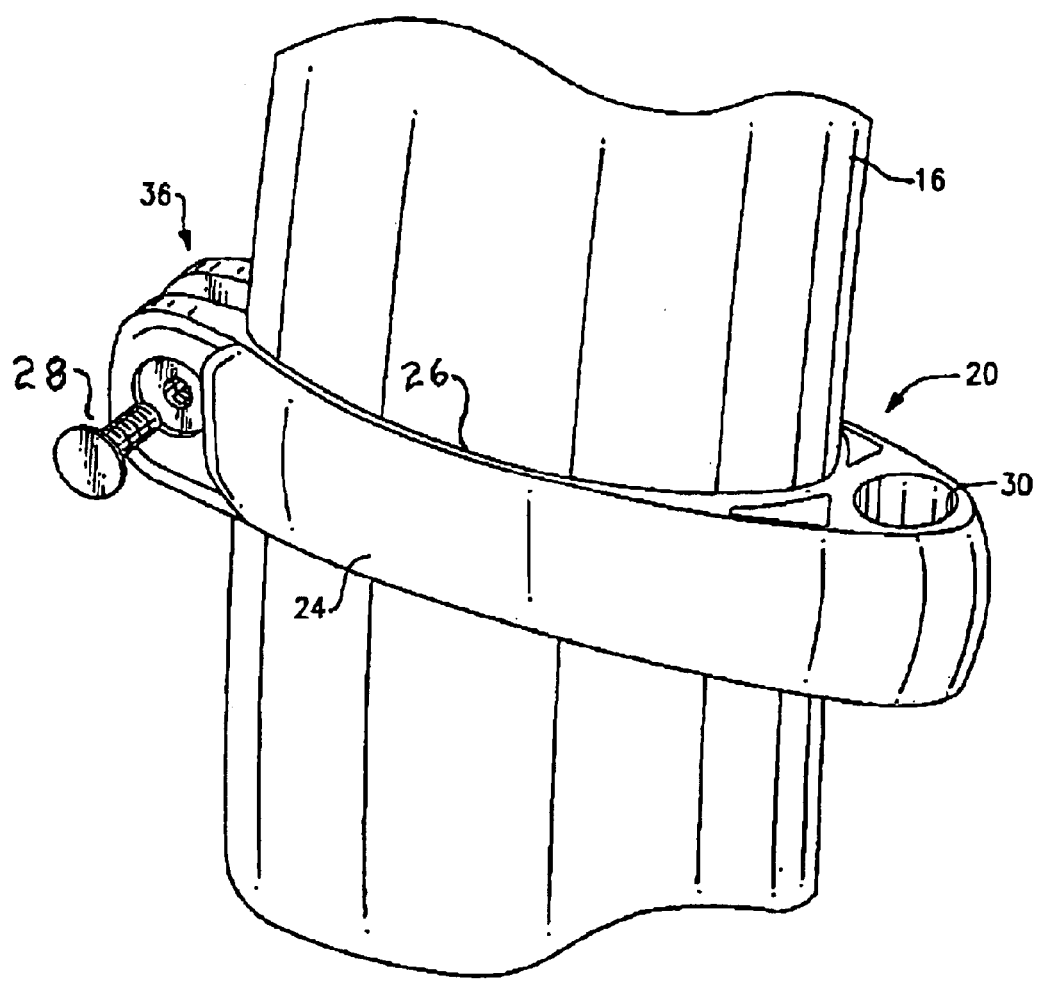
FIG. 2 is a perspective view of the support bracket of this embodiment mounted upon one of the oval cross-section columns.
Figure 3:
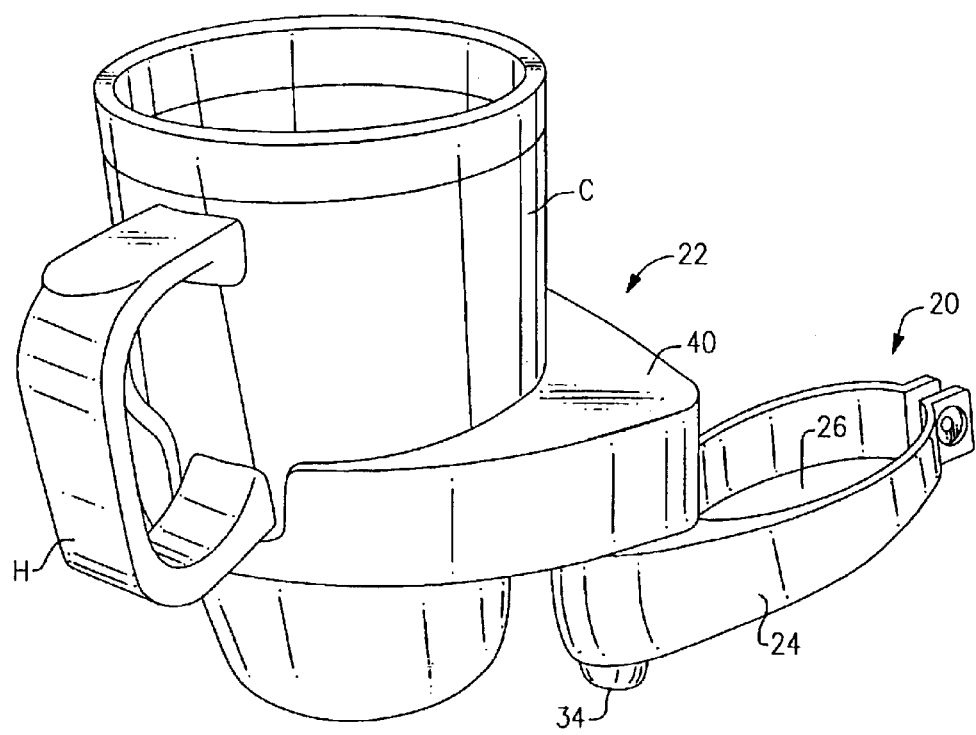
FIG. 3 is a perspective view of the a beverage cup holder member of this embodiment fitted into the support bracket.

As shown in FIG. 2, the bracket 20 has a clamp portion 24 with an oval or elliptical opening 26 through it that is adapted to match the oval cross section of the associated column 16. A threaded fastener 28 is fitted through a pair of flanges 36 at a split distal end of the clamp portion 24 and is tightened to clamp the bracket in place on the column. As an alternative, a lever type clamp or another equivalent means could be used in place of the threaded fastener shown here. A socket 30, which is a receptacle having a generally cylindrical bore with a vertical axis, is positioned at a proximal side of the bracket 20, and is aligned with a major axis of the oval opening 26. As shown in FIG. 3, the cup holder 22 is provided with a vertical pin 34 that is oriented downward and fits removably into the socket 30 of the bracket 20.

Figure 4:
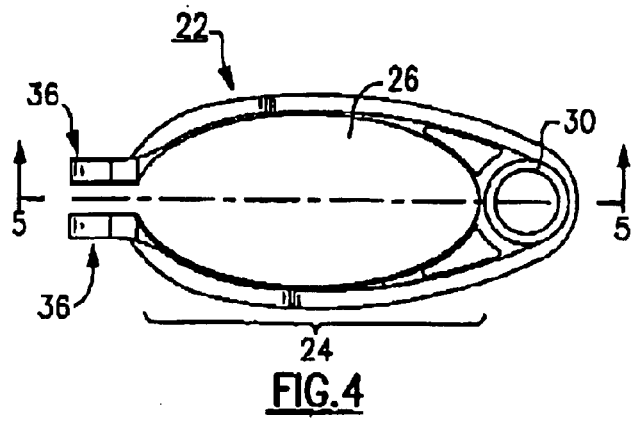
FIG. 4 is a top plan view of the support bracket.
Figure 5:
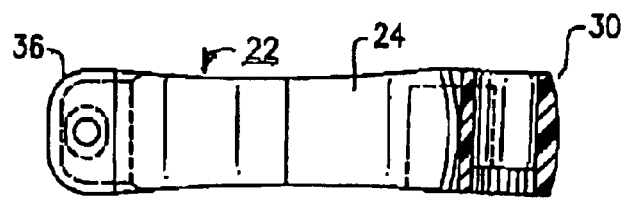
FIG. 5 is cross-sectional view of the bracket taken at 5—5 of FIG. 4.
Figure 6:
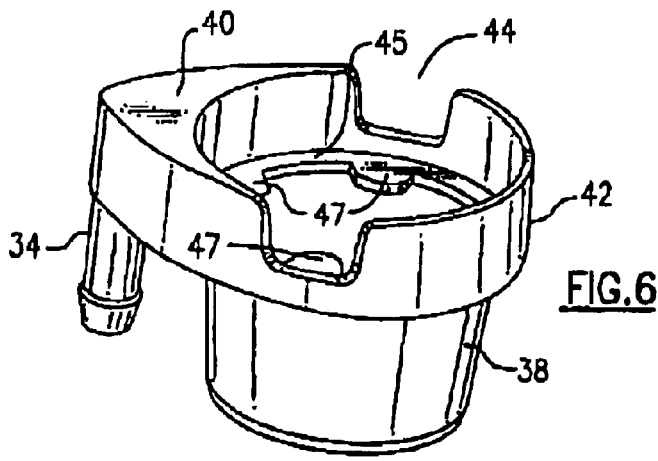
FIG. 6 is a perspective view of the beverage cup holder member.
Figure 7:
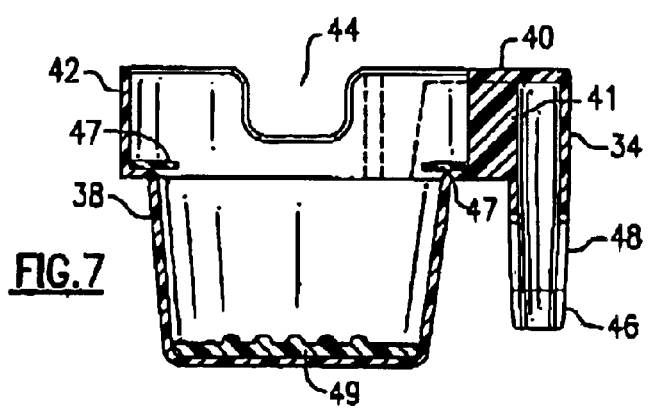
FIG. 7 is a medial cross sectional view of the beverage cup holder member.

The details of the bracket 20 are shown in more detail in FIGS. 4 and 5. The clamp portion 24 has bowed sides that define the oval opening 26, here shown with its major axis along the horizontal axis of the page. The distal flanges 36 project from the distal end of the clamp portion 24, and the socket 30 is formed at the proximal end thereof. As shown in FIGS. 6 and 7, the cup holder 22 has a generally cylindrical receptacle 38 that is adapted to hold a coffee cup C (FIG. 3) or any standard hot drink or soil drink container. A horizontal flange 40 here projects radially out from the receptacle 38 and serves as a strut from which the pin 34 projects downward so that it can be removably fitted into the socket 30 of the associated support bracket 20. In this embodiment, an additional gusset 41 is formed between the wall of the receptacle 38 and the upper part of the pin 34.

Figure 8:
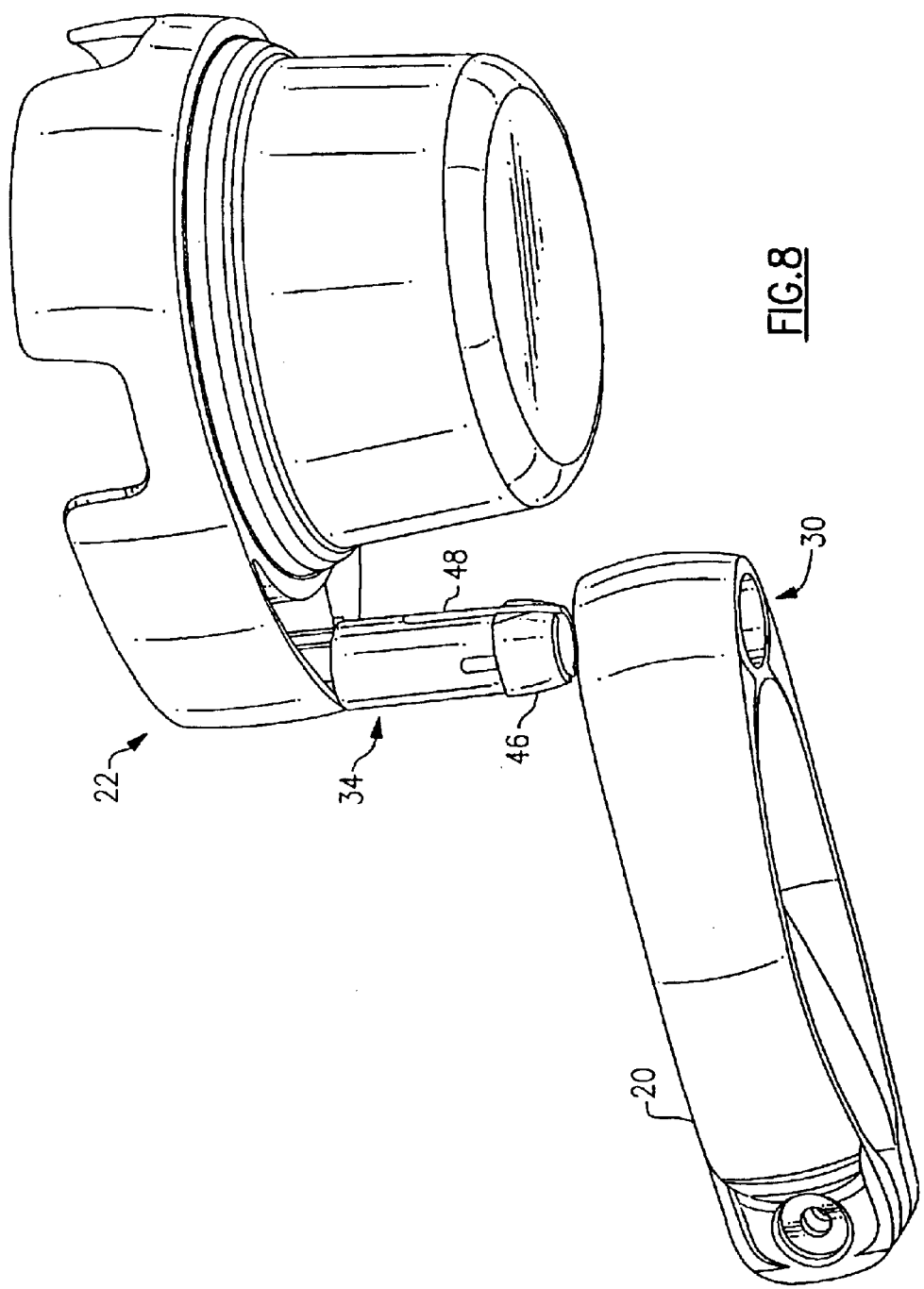
FIG. 8 is a perspective view showing the pin and detent mechanism of this embodiment.
Figure 9:
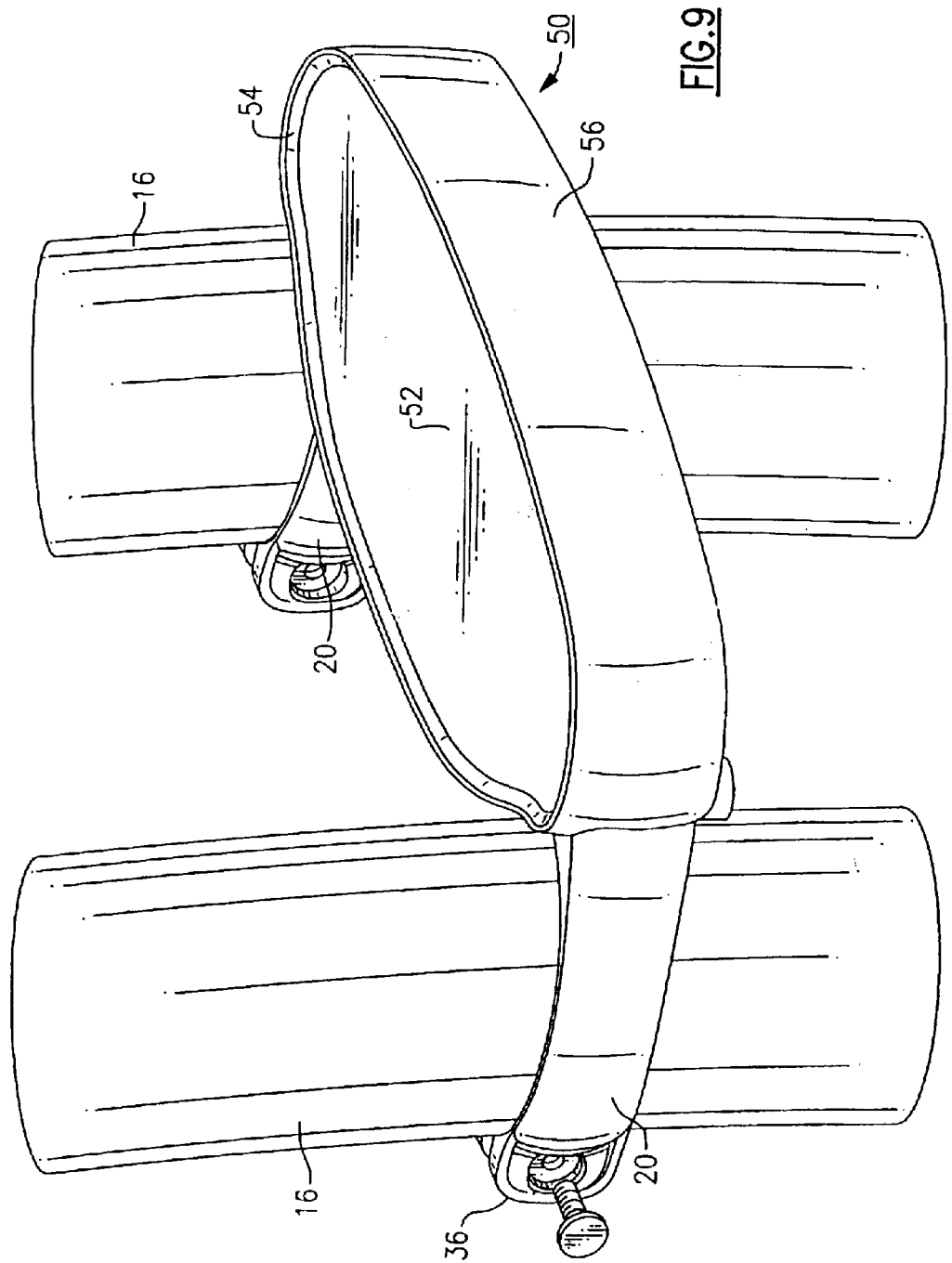
FIG. 9 is a perspective view of a tray member according to an embodiment of the invention, shown supported on a pair of the support brackets which are mounted on the two vertical columns of the vehicle.
Figure 10:
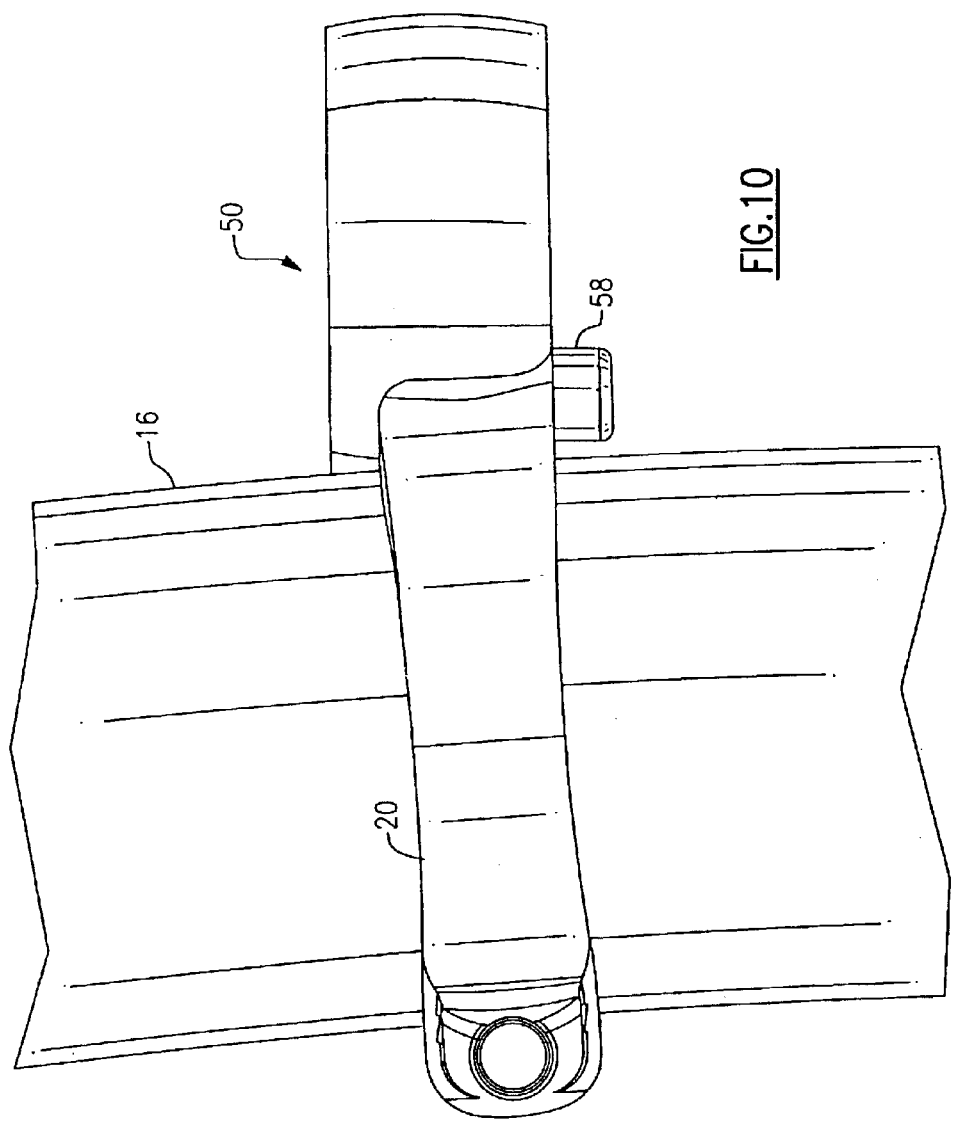
FIG. 10 is a side elevational view of this embodiment.
Figure 11:
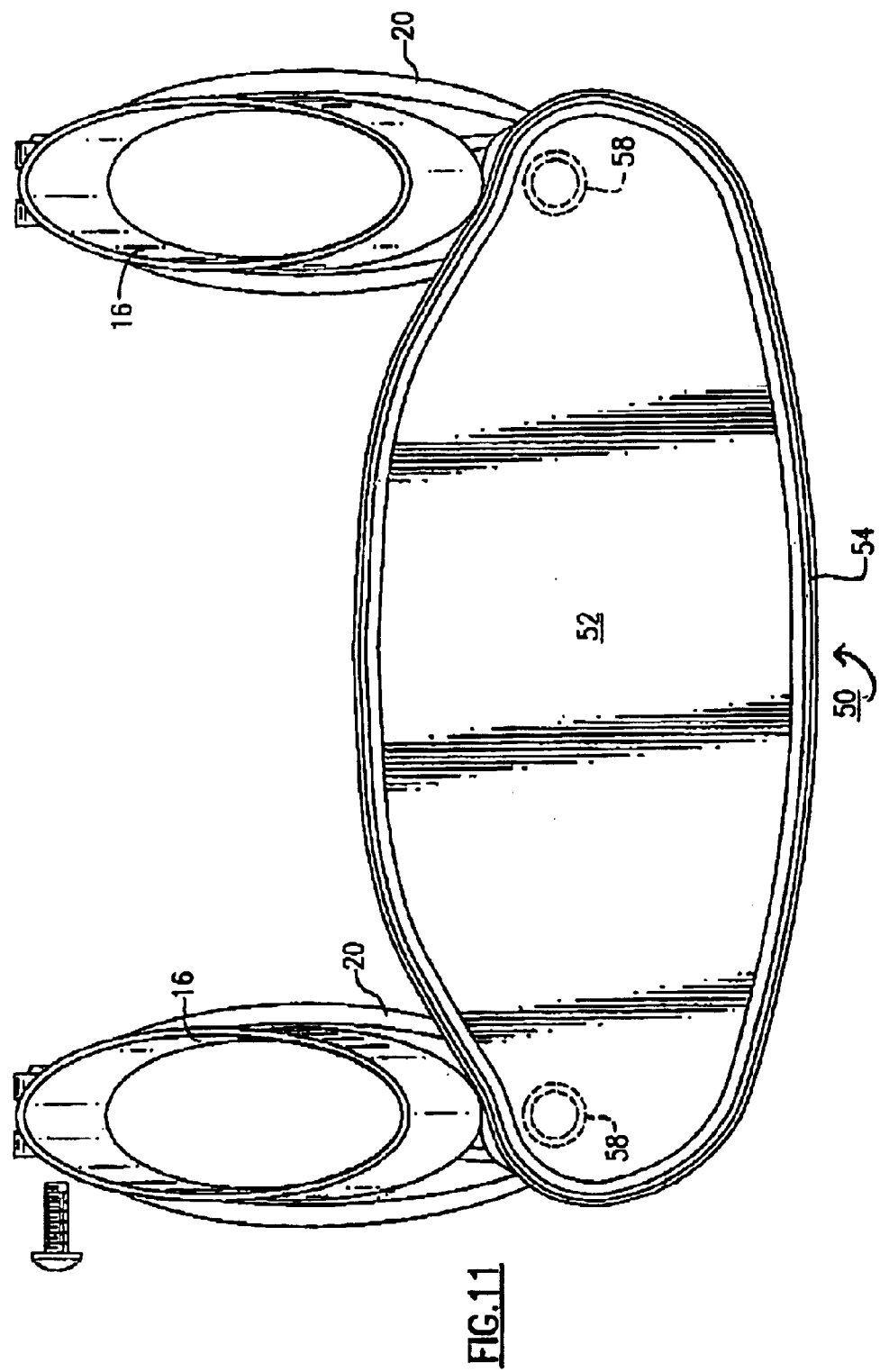
FIG. 11 is a top plan view of this embodiment.
Figure 12:
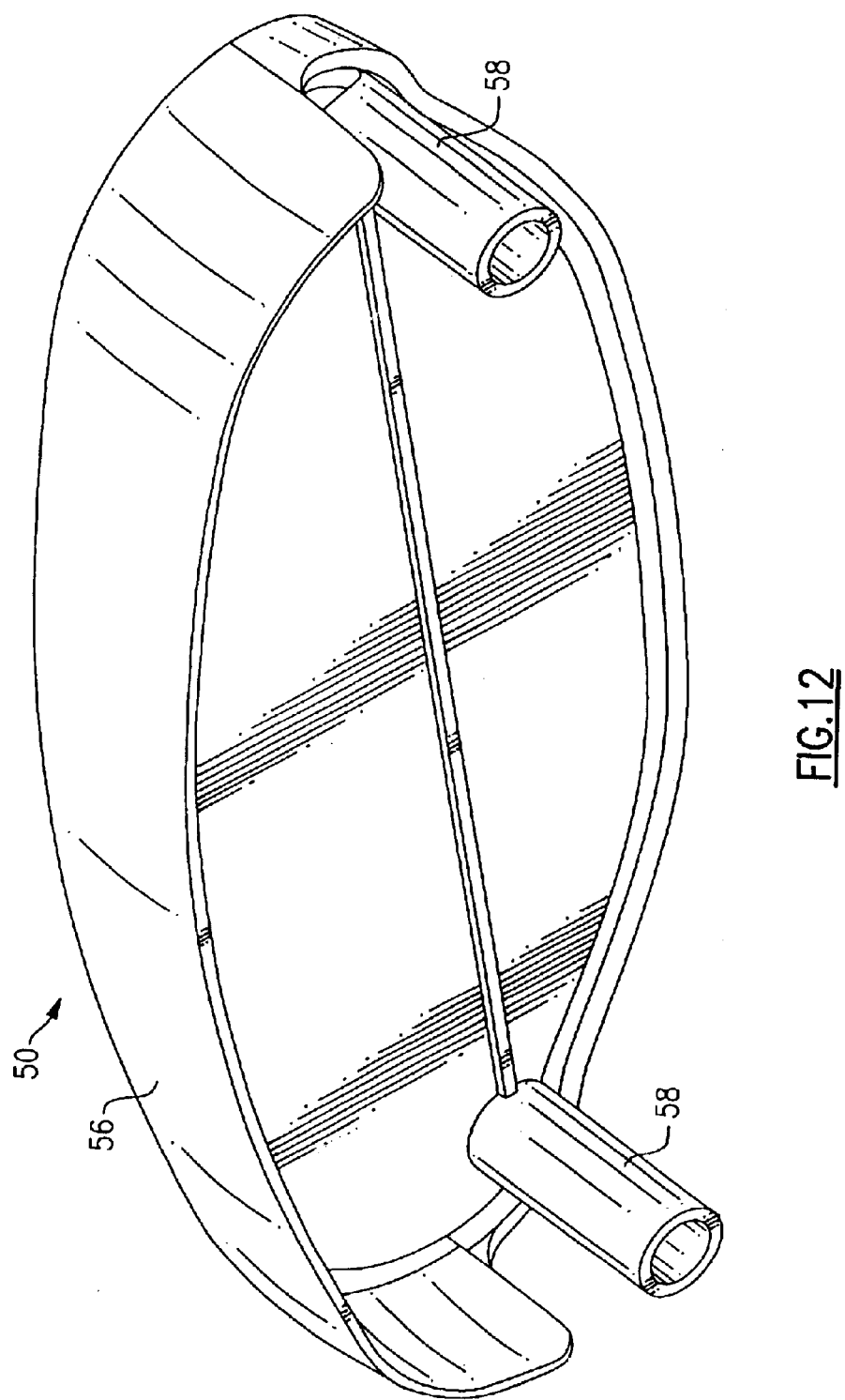
FIG. 12 is a lower perspective view of the tray member of this embodiment.

The pin 34 and the lower part of the socket 30 have mating detent structure formed on them, so that the cup holder 22 will not pop out of the bracket 20, but will not interfere with the pivoting action. The detent can be released by squeezing the pin 34 at the lower end where it protrudes below the socket 30. In this embodiment, as shown in FIG. 8, the pin 34 may have a generally tapered flange 46 at its lower tip, and a slit or cut 48 along the lower or distal half of the pin 34. In this way, the flange 46 will compress as the pin is worked into the socket 30, and the top edge of the flange 46 will catch on mating structure at the lower end of the socket 30. This will keep the cup holder 22 in place in the bracket, and not interfere with pivoting movement, but will permit the cup holder to be removed when desired. The occupant can reach under the bracket 20, and squeeze together the tip of the pin 34 that protrudes beneath the socket 30, and the pin 34 can simply be pushed upwards to release the cup holder. Of course, many other detent mechanism are possible besides the one shown.

As also shown in this embodiment, the receptacle 38 is of a stepped or shouldered construction to accommodate a variety of shapes of drink containers. An upper flange portion 42 encircles the top of the receptacle 38, and there are a pair of cutouts 44 which will accommodate a handle H of the coffee cup or container C. In this embodiment, the receptacle has a solid disk base, which will contain small spills. However, it is possible instead for the container to have an open bottom. An upper rubber ring 45 is installed at an upper part of the inside of the cup holder receptacle 38, and has a several inwardly directed half-disks or petals 47 that help hold the cup C in place and keep it from rattling. Another rubber piece 49 situated on the base of the receptacle 38 has embossments on it, and this also serves to suppress rattling. The embossments help break any capillary seals caused by liquid between the base of the cup C and the bottom of the receptacle 38. These items may be natural rubber or a resilient flexible synthetic material.

A convenience tray 50 that also embodies the principles of this invention is illustrated in FIGS. 9, 10, 11 and 12. Here the tray 50, which is supported on a pair of brackets 20, can be used for holding a sandwich or other fast food item, or a map or other article that may need a flat support. As illustrated, the two brackets 20, 20 are positioned at the same height on each of the two vertical columns 16, 16, and in the vehicle the columns are at a spaced apart laterally from one another at a fixed distance. The tray 50 is formed of a generally horizontal shelf 52 that forms a flat support surface, with a peripheral ridge 54 rising slightly above the surface of the shelf 52, to keep items from sliding or rolling off. The tray 50 also has a depending apron 56, at least on the proximal side. There are a pair of pins 58, which are laterally spaced a predetermined distance apart corresponding with the spacing between the brackets 20, 20, and these pins 58 fit into the sockets 30 of the brackets 20, respectively. These pins 58 may omit the detent structure of the pin 34. The tray 50 and the cup holder 22 can be interchangeably mounted on the brackets 20, as desired by the occupants of the vehicle. In addition, if the tray 50 is used, an additional bracket 20 can be positioned below it on one of the columns 16 and used to support the cup holder 22. In some possible embodiments, the tray 50 itself may have one or more sockets incorporated into it so that it may also be used to support the cup holder 22.

Figure 15:
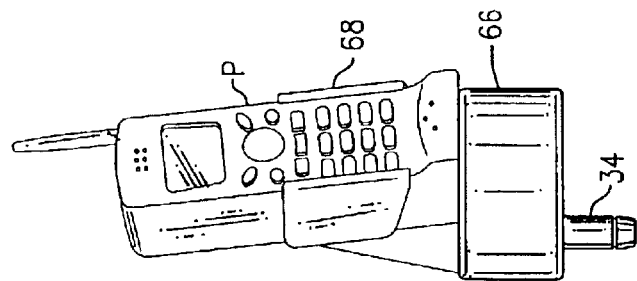
FIGS. 13, 14 and 15 are perspective views of alternative accessory support members embodying aspects of this invention, namely, a flower vase, a picture frame, and a cellular phone holder, respectively.
Figure 14:
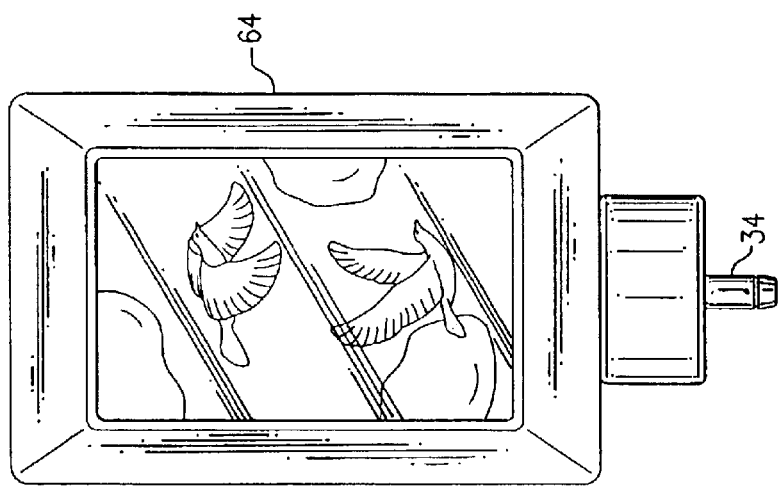
Figure 13:
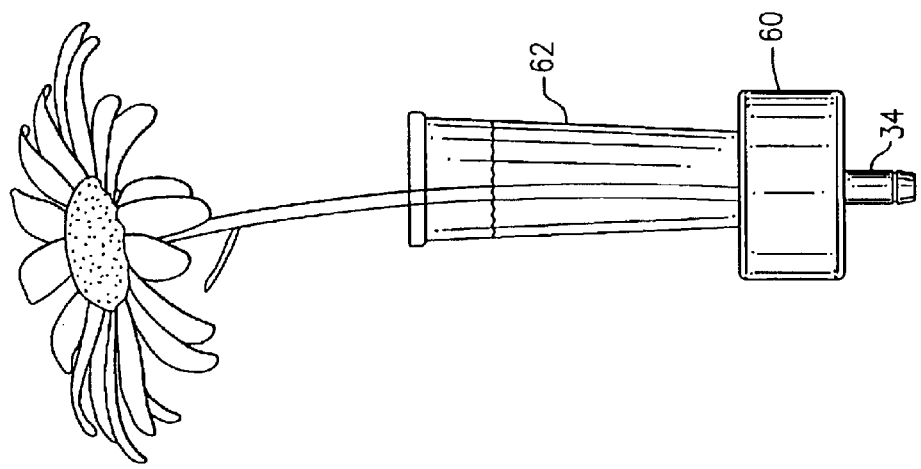

FIGS. 13, 14, and 15 illustrate other accessories that may also be fitted into the support brackets 20, if desired. Each of these accessories has a pin 34 that is identical with the pin of the cup holder, for removably fitting the socket 30 of the associated support bracket. FIG. 13 shows a flower stand 60, on which is supported a flower vase 62 of glass or acrylic. FIG. 14 shows a picture frame accessory 64, which allows the occupant to personalize the vehicle with a photograph of a loved one or a favorite scene. FIG. 15 shows a cellular phone holder 66, which includes a mounting stand 68 on which a small cellular phone device P is held for hands-free operation while in the vehicle. Many other accessories are possible in addition to those shown here, which could be supported in one or more of the support brackets 20, which would be positioned upon one or the other or both of the vertical columns 16. The cross sections of the columns and bracket apertures need not be precise ellipses, but need only be generally oblong oval rounded shapes.

While the invention has been described with reference to specific preferred embodiments, the invention is certainly not limited to those precise embodiments. Rather, many modifications and variations will become apparent to persons of skill in the art without departure from the scope and spirit of this invention, as defined in the appended claims.

I claim:

1. A vehicle accessory holder assembly adapted for use in a motor vehicle in which there are one or more generally vertical support posts of an oval cross section in a passenger compartment of the vehicle; comprising an accessory holder support bracket formed of a clamp member having a vertically oriented aperture of an oval cross section and dimensioned to fit onto one of said vertical support posts, wherein the oval cross section aperture of said clamp member has a major axis; means for tightening said clamp member in place on the associated support post; and a vertical socket positioned on said clamp member, wherein the vertical socket of the support bracket is aligned along the major axis of said oval cross section;

an accessory holder for supporting an accessory item in said passenger compartment, including a vertical pin removably fitting into the socket of said support bracket.

2. The vehicle accessory holder assembly of claim 1 wherein said accessory holder includes a beverage cup holder having a generally cylindrical receptacle member, a strut in the form of a flange extending from one side of said receptacle member, and said pin being affixed on said strut and extending vertically downward from said strut, said beverage cup holder being pivotable about a vertical axis defined by said pin and said socket so that the cup holder remains level in a plurality of selected positions.

3. The vehicle accessory holder assembly of claim 2 wherein there are a pair of cutouts disposed oppositely on an upper portion of said receptacle member to accommodate a handle of a beverage cup.

4. The vehicle accessory holder assembly of claim 2 further comprising a plurality of resilient inwardly-directed petals in said receptacle member.

5. The vehicle accessory holder assembly of claim 2 further comprising a resilient member disposed at a base of said receptacle and having embossments thereon.

6. The vehicle accessory holder assembly of claim 1 wherein said pin and socket permit left to right swinging movement of the accessory holder about a vertical axis.

7. The vehicle accessory holder assembly of claim 1 wherein said accessory holder includes a horizontal platform and a mount on said platform for removably holding a cellular phone instrument.

8. The vehicle accessory holder assembly of claim 1 wherein said accessory holder includes a vase for holding one or more cut flowers.

9. The vehicle accessory holder assembly of claim 1 wherein said accessory holder includes a tray member having a flat support surface and said pin being rigidly affixed on said flat support surface and depending from a rear portion of said flat support surface.

10. The vehicle accessory holder assembly of claim 1 wherein said clamp member has a pair of opposed bowed sides that together define the oval cross section aperture, the bowed sides being unitarily formed with the support bracket at a proximal side of the clamp member and each said bowed side having a flange projecting from a distal side thereof, with said means for tightening being supported on said flanges.

11. A vehicle accessory holder assembly adapted for use in a motor vehicle in which there are one or more generally vertical support posts in a passenger compartment of the vehicle; comprising an accessory holder support bracket formed of a clamp member having a vertically oriented aperture dimensioned to fit onto one of said vertical support posts; means for tightening said clamp member in place on the associated support post; and a vertical socket positioned on said clamp member and extending vertically therethrough;

an accessory holder having a receptacle formed thereon for supporting an accessory item in said passenger compartment, including a member projecting horizontally from said receptacle, a vertical pin located on said projecting member and removably fitting into the socket of said support bracket and extending through the socket and beneath said clamp member;

wherein the socket of said bracket and the pin of said accessory holder have releasable interengaging detent structure thereon which prevent the accessory holder from popping out of the support bracket, but permit rotation of the pin in said socket, and which permit a user to release the pin from the socket by reaching under the clamp member and squeezing said pin.

12. The vehicle accessory holder assembly of claim 11 wherein said detent structure includes a tapered flange at a tip of said pin having an edge that releasably catches with a lower portion of said socket.

13. A vehicle accessory holder assembly adapted for use in a motor vehicle in which there are one or more generally vertical support posts of an oval cross section in a passenger compartment of the vehicle; comprising an accessory holder support bracket formed of a clamp member having a vertically oriented aperture dimensioned to fit onto one of said vertical support posts; means for tightening said clamp member in place on the associated support post; and a vertical socket positioned on said clamp member;

an accessory holder for supporting an accessory item in said passenger compartment, including a vertical pin fixedly positioned on said accessory holder and removably fitting into the socket of said support bracket;

wherein the socket of said bracket and the pin of said accessory holder have releasable interengaging detent structure thereon which prevent the accessory holder from popping out of the support bracket, but permit rotation of the pin in said socket, wherein said detent structure includes a tapered flange at a tip of said pin, and wherein said pin has a slot formed at a lower portion thereof.

14. A vehicle accessory holder assembly adapted for use in a motor vehicle in which there are a pair of generally vertical laterally spaced support posts of an oval cross section in a passenger compartment of the vehicle; comprising a pair of accessory holder support brackets, each formed of a clamp member having a vertically oriented oval cross section aperture dimensioned to fit onto an associated one of said vertical support posts; means for tightening said clamp member in place on the associated support post; and a vertical socket fixedly positioned on said clamp member; wherein the oval cross section aperture of each said clamp member has a major axis, and the vertical socket of the associated support bracket is aligned on the major axis of the oval cross section of said aperture; and an accessory holder for supporting an accessory item in said passenger compartment, including at least one vertical pin removably fitting into the socket of one of said support brackets.

15. The vehicle accessory holder assembly of claim 14, wherein said accessory holder comprises a tray member, including a generally horizontal shelf member, and a pair of vertical pins affixed onto said shelf member that extend down from a rear portion of said horizontal shelf member and engage respective sockets of said pair of brackets, such that the tray member is supported on said pair of brackets.

16. The vehicle accessory holder assembly of claim 14, further comprising a peripheral ridge rising above said horizontal shelf member at a periphery thereof.

17. The vehicle accessory holder assembly of claim 16, further comprising an apron depending from a proximal side of said shelf member but being absent at a distal side of said shelf member.

* * * * *

UNITED STATES PATENT AND TRADEMARK OFFICE
CERTIFICATE OF CORRECTION

PATENT NO. : 6,832,745 B2
DATED : December 21, 2004
INVENTOR(S) : Paul H. Lindsay It is certified that error appears in the above-identified patent and that said Letters Patent is hereby corrected as shown below:

Column 3,
Line 64, "soil" should read -- soft --

Signed and Sealed this

Twenty-ninth Day of March, 2005

JON W. DUDAS
*Director of the United States Patent and Trademark Office*